(12) United States Patent
Beard (10) Patent No.: US 10,450,176 B1
(45) Date of Patent: Oct. 22, 2019

(54) BARREL HANDLING APPARATUS

(71) Applicant: ECHO BRAVO LLC, Santa Rosa, CA (US)

(72) Inventor: Thomas E Beard, Healdsburg, CA (US)

(73) Assignee: Echo Bravo, LLC, Santa Rosa, CA (US)

(*) Notice: Subject to any disclaimer, the term of this patent is extended or adjusted under 35 U.S.C. 154(b) by 0 days.

(21) Appl. No.: 16/132,104

(22) Filed: Sep. 14, 2018

Related U.S. Application Data (60) Provisional application No. 62/560,792, filed on Sep. 20, 2017.

(51) Int. Cl.
*B66F 9/18* (2006.01)

(52) U.S. Cl.
CPC .......... *B66F 9/187* (2013.01); *B62B 2202/02* (2013.01); *Y10S 414/124* (2013.01)

(58) Field of Classification Search
CPC ..... B62B 1/264; B62B 3/104; B62B 2202/02; B66F 9/184; B66F 9/187; Y10S 414/124
USPC .................................................. 414/450, 452
See application file for complete search history.

(56) References Cited

U.S. PATENT DOCUMENTS

| | | | | |
|---|---|---|---|---|
| 2,077,349 A | * | 4/1937 | Hobbis | B62B 1/264 280/47.23 |
| 2,645,372 A | * | 7/1953 | Broersma | B66F 9/19 414/620 |
| 2,756,888 A | * | 7/1956 | Avery | B66F 9/187 414/621 |
| 3,319,815 A | | 5/1967 | Albam | |
| 3,396,862 A | * | 8/1968 | Fischer | B66F 9/061 212/203 |
| 3,410,431 A | | 11/1968 | Albam | |
| 3,448,880 A | | 6/1969 | Howard | |
| 3,583,586 A | * | 6/1971 | Burton | B66F 9/184 294/106 |
| 3,893,579 A | | 7/1975 | Glewwe | |
| 3,971,485 A | * | 7/1976 | Hoppey | B66F 9/19 414/420 |
| 4,318,661 A | * | 3/1982 | Helm | B66F 9/187 294/103.1 |
| 4,951,990 A | * | 8/1990 | Hollan | B66F 9/184 294/119.1 |
| 5,020,963 A | | 6/1991 | Okada | |

(Continued)

*Primary Examiner* — James Keenan
(74) *Attorney, Agent, or Firm* — Edward S. Sherman (57) ABSTRACT

A device for handling stacked barrels attaches to the end of a forklift truck. The opposing ends of the device deploys a pair of grip members to grasp opposing upper and lower edges of the barrel over at least about half of the circumference at the head or chime hoop. The grip members have an arcuate shape and pivot about a coupling holding them in rotary and parallel engagement with an upper and a lower support armature. The upper and lower support armatures are coupled at opposing ends to a common bracket. The common bracket is titled by a second actuator to rotate the grasped barrel from a vertical to horizontal orientation, such as for placement in or removal from barrel racks used for holding filled barrels during fermentation and/or aging. A support beam for the common bracket may be a horizontal frame that accepts forklift tines. The actuators of the device are connected to a common controller installed in the operator cabin of the forklift truck.

27 Claims, 9 Drawing Sheets

(56) References Cited

U.S. PATENT DOCUMENTS

| | | | |
|---|---|---|---|
| 5,281,076 A | 1/1994 | Lehman | |
| 5,486,083 A * | 1/1996 | Thompson | B66F 9/185 |
| | | | 294/67.31 |
| 5,496,147 A * | 3/1996 | Taube | B66F 9/187 |
| | | | 294/90 |
| 6,024,529 A * | 2/2000 | Kristensen | B66F 9/181 |
| | | | 294/65 |
| 8,141,924 B2 * | 3/2012 | Albin | B66F 9/065 |
| | | | 294/106 |
| 2004/0197178 A1 * | 10/2004 | Osterloh | B66F 9/187 |
| | | | 414/607 |
| 2004/0226451 A1 | 11/2004 | Diaz | |

* cited by examiner

BARREL HANDLING APPARATUS

CROSS REFERENCE TO RELATED APPLICATIONS

The present application claims the benefit of priority to the US Provisional patent application of the same title that was filed on Sep. 20, 2017, having application No. 62/560,792, which is incorporated herein by reference.

BACKGROUND OF INVENTION

The field of inventions is material handling equipment, and more specifically a fork lift style device for handling and manipulating barrels, including unloading from tight packing vertical packing to horizontal placement in racks.

Devices are well known that allow barrels to be lifted and moved by forklift trucks. They are typically for industrial metal barrels, and the gripping is usually along the center circumference.

In the case of wooden barrels, such as are used in the production of spirits, fine wines and craft beers, gripping the center of the barrel is problematic. The grip member can detach or damage anything in the bung hole of a full barrel, or the gripping force could damage the barrel.

Such prior art devices are typically used to lift and move barrels that are upright, and remain upright after movement by the forklift.

It is easier to ship empty barrels upright, that is the cylindrical axis is vertical.

However, filled barrels are stored disposed with the cylindrical axis horizontal, usually to set in racks that space apart adjacent barrel and then stagger the lateral rows when stacking racks in a wall like structure. This stacked arrangement provide access to the upright bung hole at the center of the barrel for inspection, filling, sampling and pumping or siphoning the contents without removing the barrels from the rack.

However, such wood barrels eventually need to be cleaned, shaved, reconditioned and/or re-toasted, some of which can only be done at central facilities in which the barrel is in upright orientation with the cylindrical axis vertical.

According, it would be desirable to provide an apparatus capable of both moving barrels to and from racks (horizontal orientation of the cylindrical axis) and rotating them to an upright orientation for storage, shipment and repair or re-conditioning at for example, different and remote facilities.

In such relocation to remote facilities, or return to a winery for use, it is also desirable to pack them laterally in trucks, while also stacking each laterally packed layer on another.

Such close packing in layers presents challenges for moving all the barrels in a truck, or into a truck, with only a forklift and no hand labor. The gripping mechanism and clearance to remove and disengage the grip members may require clearance around each barrel.

Lifting barrel and transporting them even a short distance to stack/un-stack them, as well as align them, can require multiple works, subjecting each to risk repetitive strain and other injuries, including falling barrels when appropriate pre-cautions are not taken.

Accordingly, the inventor has determined there is a need for improved barrel handling mechanisms more compatible with the use of wooden wine barrels, for both storage and shipping that fully eliminates the need for hand labor in lifting, rotating and moving barrels.

The inventor has also determined there is a need for such improved barrel handling mechanisms that are highly efficient and avoid damage to the barrels during gripping.

More particularly, there is such a need for such improved barrel handling mechanisms adapted to wooden wine barrels, for both storage and shipping, which fully eliminates the need for hand labor in lifting, rotating and moving barrels.

Accordingly, among many objectives of the invention are improved worker safety with preferably improved efficiency, in a manner that avoids damage to person or barrels from either handling or collapse of unstable stacks.

Another objective necessary to obtain such efficiency and safety, is a means to safely and accurately reach and place barrels in confined spaces, the confinement being imposed by the interior walls of a structure, such as a truck interior, as well as the rows and stack of adjacent barrels, in addition to the vertical racks structure when the barrels are placed for use.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a device for barrel handling comprising a horizontal frame member adapted to be elevated and transported by a fork lift truck, a support beam having an upward extending portion that is coupled at a base to the horizontal frame with a laterally extending portion coupled to the extend outward from a distal end of the upward extending portion, a common bracket member having opposing ends that is coupled in rotary engagement with the support beam for being disposed between a vertical position and a horizontal position, upper and lower support armatures each being disposed at opposing ends of the common bracket member, each of the upper and lower support armatures having; at least one grip actuator, a pair of opposing arcuate grips, each grip having a proximal end in rotary engagement with an opposing portion of support armature than the other grip of the pair, and a distal end opposite the proximal end, and wherein the at least one grip actuator is operative to cause the distal end of each grip to move towards and away from the distal end of the other grip, a principal actuator for rotating the common bracket member from vertical to horizontal for rotating a barrel when the barrel is grasped by the grip actuators at the top and bottom edge of the barrel and the rotation is from a vertical to horizontal orientation.

A second aspect of the invention is characterized by such a device for barrel handling wherein a center of the common bracket member is coupled in rotary engagement with the support beam for being disposed between a vertical position and a horizontal position.

Another aspect of the invention is characterized by any such a device for barrel handling further comprising a first and second barrel of identical dimensions to the first barrel in which each of the arcuate grips have a distal taper defined by a distal inner perimeter with a first radius of curvature that matches a head chime of said first and second barrels, and a distal outer perimeter with a second radius of curvature that is larger than the first radius of curvature to accommodate clearing the second barrel when the second barrel is immediately adjacent to the first barrel and when the arcuate grips engage the head chime of the first barrel.

Another aspect of the invention is characterized by any such a device for barrel handling wherein the least one grip actuator is one of a motors and a hydraulic drive system.

Another aspect of the invention is characterized by any such a device for barrel handling having two pairs of actuators for rotating each pair of arcuate grips in opposing directions about each of the upper and lower support armatures.

Another aspect of the invention is characterized by any such a device for barrel handling comprising a first and second grip actuators, each actuator being a hydraulic cylinders having a rod in pivoting connection to a distal portion of the arcuate grips and an opposing end of each cylinder coupled to a portion of the upper and lower support armatures that is proximal to the coupling to the common bracket.

Another aspect of the invention is characterized by any such a device for barrel handling wherein each arcuate grip has a tip member that is urged to tilt outward by a biasing spring member, wherein the inward movement of the arcuate grips by the actuator urges the tip member to tilt inward to grasp at least a portion of the edge of the barrel.

Another aspect of the invention is characterized by any such a device for barrel handling wherein the upper and lower grips are operative to open and close in unison.

Another aspect of the invention is characterized by any such a device for barrel handling further comprising a controller for installation in a fork lift cab to that is operative to energy each actuator.

Another aspect of the invention is characterized by any such a device for barrel handling further comprising a means to mount the horizontal frame on a fork lift truck.

Another aspect of the invention is characterized by any such a device for barrel handling further comprising a means to laterally position and lock the support beam on the horizontal frame.

Another aspect of the invention is characterized by any such a device for barrel handling wherein the support beam has an inverted "U"-shaped portion to receive the horizontally rotated common bracket.

Another aspect of the invention is characterized by any such a device for barrel handling wherein the support beam has a proximal notch on opposing sides of the inverted "U"-shaped portion to accommodate a base of the lower support armatures when the principal actuator is energized to rotate the common bracket member to a horizontal position.

Another aspect of the invention is characterized by any such a device for barrel handling wherein the means to mount the horizontal frame on a fork lift truck is one of channels in the horizontal frame to receive tines of a fork lift truck, vertical plate that support a vertical side of the support beam, and a coupling for cantilever support of the support beam.

Another aspect of the invention is characterized by any such a device for barrel handling that further comprises a means to laterally position and lock the support beam on the horizontal frame.

Another aspect of the invention is characterized by any such a device for barrel handling wherein the means to laterally position and lock the support beam on the horizontal frame are lateral support brace rails that extend through pairs of aperture on the bottom of the support beam.

Another aspect of the invention is characterized by a device for barrel handling comprising a support beam disposed in a horizontal orientation, a common bracket member having opposing ends that is coupled in rotary engagement with the support beam for being disposed between a vertical position and a horizontal position, upper and lower support armatures each being disposed at opposing ends of the common bracket member, each of the upper and lower support armatures having; at least one grip actuator, a pair of opposing arcuate grips, each grip having a proximal end in rotary engagement with an opposing portion of support armature than the other grip of the pair, and a distal end opposite the proximal end, wherein the at least one grip actuator is operative to cause the distal end of each grip to move towards and away from the distal end of the other grip, a principal actuator for rotating the common bracket member from vertical to horizontal for rotating a barrel grasped by the grip actuators at the top and bottom edge of the barrel from a vertical to a horizontal orientation.

Another aspect of the invention is characterized by any such a device for barrel handling wherein each of the arcuate grips has distal taper defined by a distal inner perimeter with a first radius of curvature and a distal outer perimeter with a second radius of curvature that is larger than the first radius of curvature.

Another aspect of the invention is characterized by a method of moving barrels comprising the steps of providing a device for barrel handling comprising a transportable support member, a common bracket member having opposing ends that is coupled in rotary engagement with the support member for being disposed between a vertical position and a horizontal position, upper and lower support armatures each being disposed at opposing ends of the common bracket member, each of the upper and lower support armatures having at least one grip actuator, a pair of opposing arcuate grips, each grip having a proximal end in rotary engagement with an opposing portion of support armature than the other grip of the pair, and a distal end opposite the proximal end, wherein the at least one grip actuator is operative to cause the distal end of each grip to move towards and away from the distal end of the other grip, a principal actuator for rotating the common bracket member from vertical to horizontal for rotating a barrel grasped by the grip actuators at the top and bottom edge of the barrel from a vertical to a horizontal orientation, providing at least one barrel having a bilge disposed an upper and lower chime, in which the bilge is wider than the chime, approaching the at least one barrel to position the opposing grips of the upper support armature about one of the upper and lower chime of the barrel and positioning the opposing grips of the lower support armatures about the other chime of the barrel, energizing the at least one actuator of the upper and lower support armatures to grasp the upper and lower chimes of the barrel, energizing the principal actuator to rotate the common bracket member from vertical orientation by at least 90 degrees to modify the orientation of at least one barrel grasped by the grip actuators.

Another aspect of the invention is characterized by such a method of moving barrels wherein the arcuate grips are sized to accommodate a natural spacing of upper and lower chime of barrels that are identical to the at least one barrel and in closest proximity at the bilge.

The above and other objects, effects, features, and advantages of the present invention will become more apparent from the following description of the embodiments thereof taken in conjunction with the accompanying drawings.

BRIEF DESCRIPTION OF DRAWINGS

FIG. 6A is a top plan view of another embodiment of an arcuate grip member, whereas FIG. 6B is a side elevation view thereof.

DETAILED DESCRIPTION

Referring to FIGS. 1 through 9, wherein like reference numerals refer to like components in the various views, there is illustrated therein a new and improved barrel handling apparatus, generally denominated 100 herein.

In accordance with an exemplary embodiment of the present invention, the barrel handling apparatus 100 comprises a generally horizontally disposed frame 110 and a support beam 120 that cantilevers over the horizontal frame 110. A common bracket 130 is coupled to a distal end of the support beam 120. The common bracket 130 is coupled at a mid-point thereof to rotate about an axis A6 via a rotary coupling 132 to a distal portion of the support beam 120. The common bracket 130 also has attached at opposing ends upper 140 and lower 140' support armatures. The upper and lower support armatures 140 and 140' are spaced apart at the height (H) of the barrel 10 that is to be transported. Thus, the lower 140' and upper 140 support armatures have coupled at a distal end a pair opposing arcuate grips 151 and 152 for grasping a portion of the upper and lower circumference of the barrel 10 at the head or chime hoop 11. The support armatures 140 and 140' are preferably formed of spaced apart plates 240 and 240'.

It should first be appreciated that the various embodiments of the invention actually grasp the barrels 10 around a portion of the circumference at the sides, adjacent to the top and bottom bases or heads 13, which is also understood in the industry to be the heads or chime hoop 11. This region of the barrel 10 is strong and resilient to compression even when the barrel 10 is empty, being reinforced by the adjacent cants or planks 14 that comprise the upper and lower heads 13 and 13'.

In order to grip the barrel 10 about the upper and lower head hoops 11 and 11' the device 100 deploys a first pair of arcuate grips are 151 and 152. The first pair of arcuate grips are 151 and 152 are connected in a rotary coupling for pivoting engagement within the upper support armature 140, and the second pair of arcuate grips 151' and 152' are similarly coupled pivoting engagement within the lower support armature 140'. The first pair 151/152 grasp the upper head hoop 11 of the barrel 10 while the second pair 151'/152' grasp the lower or bottom head hoop 11'.

After the barrel 10 has been transported and option flipped in orientation between vertical and horizontal, the arcuate grips 151/152 and 151'/152' may pivot outward, each grip member (151 and 151') away from the other arcuate grip member (152 and 152', to release the barrel 10. To grasp the barrel 10, the arcuate grips pivot inward, each arcuate grip member rotating toward the other arcuate grip. That is grip member 151 moves toward member 152. Grips member 151' moves toward 152'.

Each of the upper first and lower/second pair of pivoting grips is set in a supporting upper 140 and 140' lower armature. These armatures 140 and 140' are disposed at opposing end of a common bracket 130. The common bracket 130 extends about the height of the barrel to set the grips pairs apart at the spacing of the upper and lower head hoops 11 and 11'. The common bracket 130 is supported at the center thereof by a support beam 120. As the common bracket 130 rotates within the supporting connection to the support beam 120, the barrels held in the grips 151/152/151'/152' can be rotated between a vertical and horizontal orientation.

Figure 5:
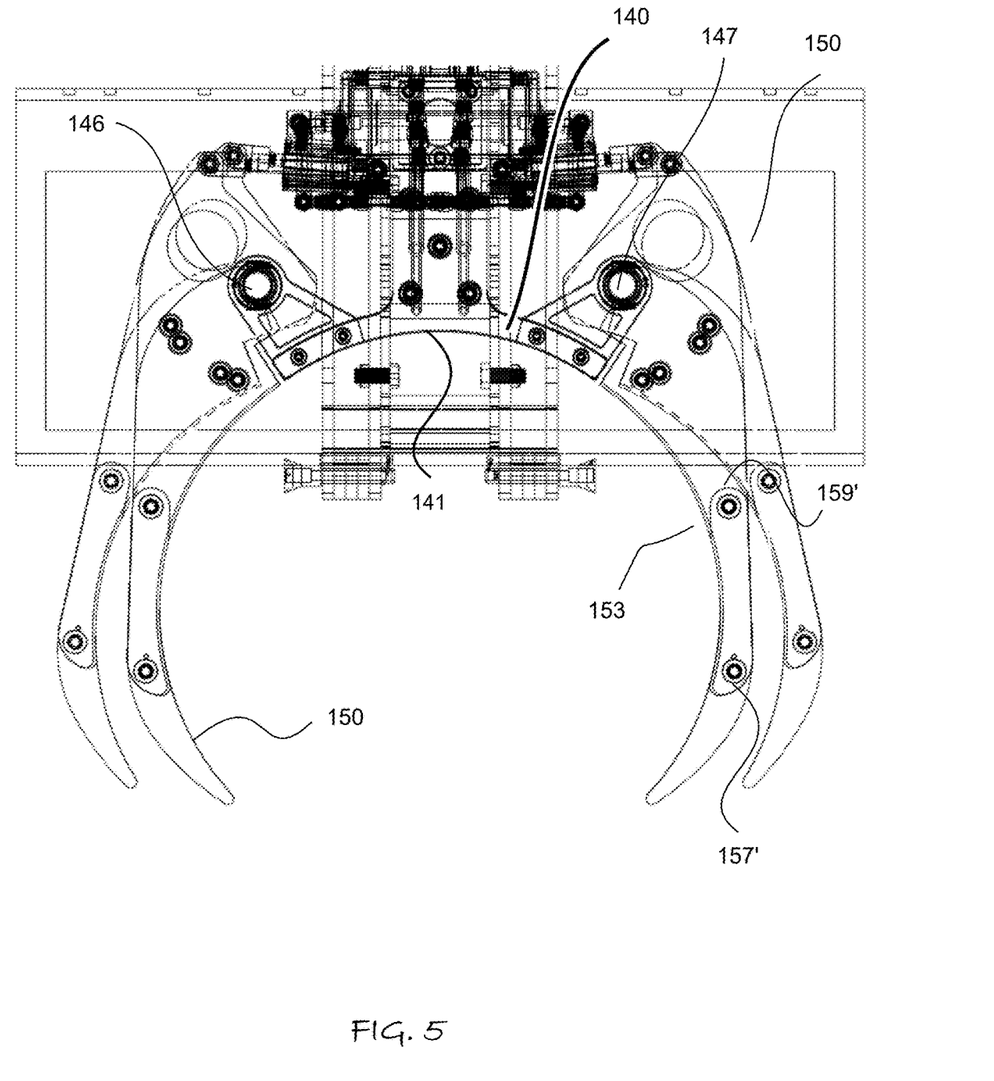
FIG. 5 is a top plan view of the movement of the opposing arcuate grips about the head loop of a barrel to illustrate the clearance from adjacent barrels on opposing sides.

It should be appreciated that the above components offer a compacted shape, as from the connection of the support beam 120 to the grip members 151-152' the profile of the device 100 funnels downward in shape to not interfere with barrels 10 immediately adjacent the target barrel 10 to be manipulated, that is to the lateral sides, bottom and lower sides of adjacent barrels. This enables close packing and removal of barrels 10, as well as placement in or removal from an enclosed spaced entirely by the device 100, thus avoiding the need for personnel to directly handle any barrel. This funneling of lateral and vertical dimension is best appreciated with reference to the plan view of FIG. 5, showing the movement of the grips 151-152' in picking and moving vertically stacked barrels.

The movement of the above components is controlled by one or more actuators that urges a distal portion of the member being rotated. More particularly, in preferred embodiments actuators 160, 171 and 172 are deployed.

Figure 2:
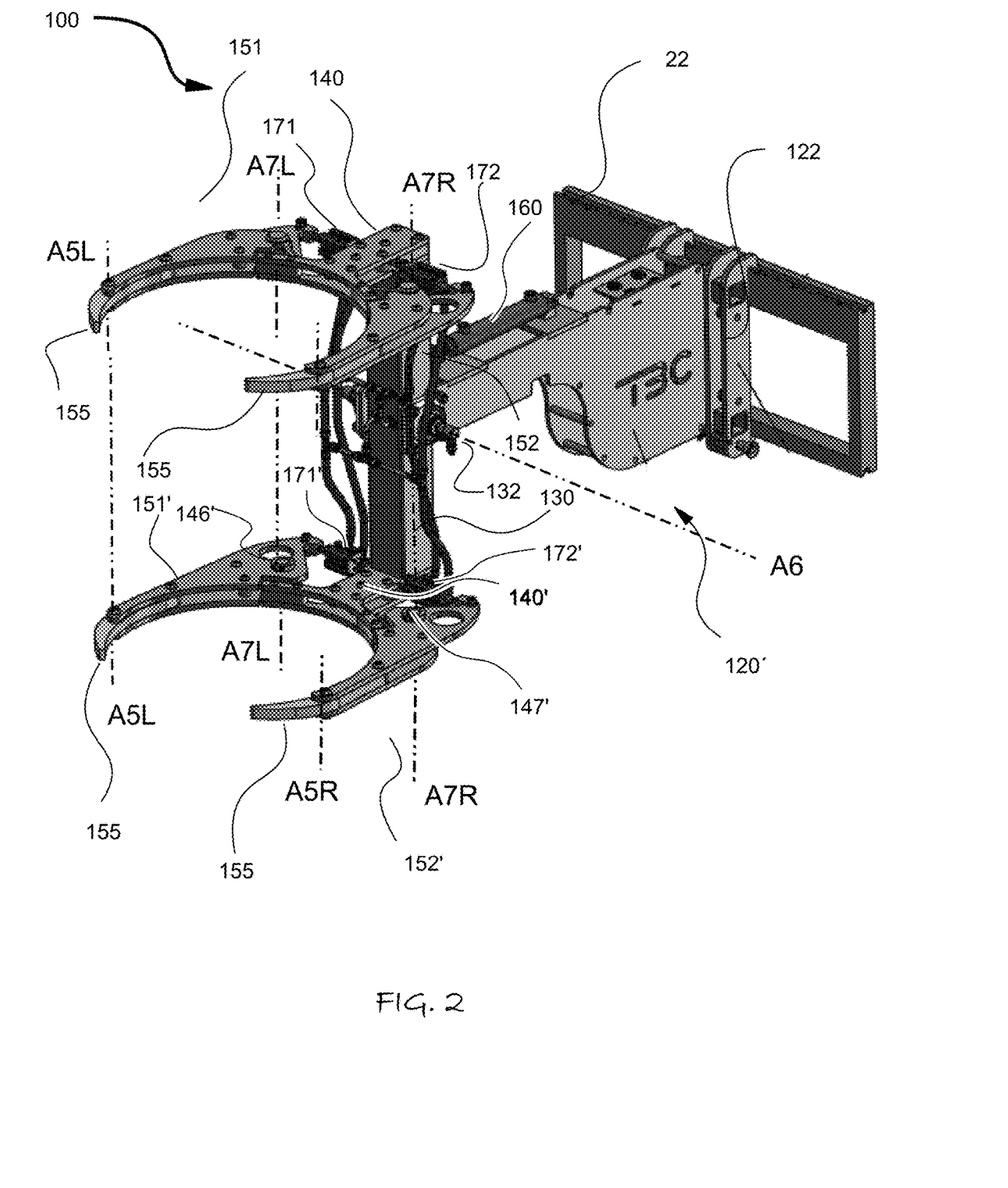
FIG. 2 is a perspective view of an embodiment of the apparatus for mounting to a face frame of a forklift when the conventional spaced apart tines are removed.

FIG. 2 illustrated actuators 171 and 171' that are respectively operative to the rotate and pivot the grips 151 and 151' about axis A7L. Likewise, the actuators 172 and 172' are respectively operative to the rotate and pivot the grips 152 and 152' about axis A7R. The rotation of the upper arcuate grips 151 and 152 at the upper armature 140 occurs at the rotary couplings 146 and 147 respectively. The rotation of the lower arcuate grips 151' and 152' at the lower armature 140' occurs at the rotary coupling 146' and 147' respectively.

The actuator 171 and 172 are preferably hydraulic cylinders having a rod in pivoting connection to a distal portion of the grip members with the opposing end of each cylinder coupled to the portion of the upper and lower support armatures 140 and 140' that are proximal to the coupling to the common bracket 130. It should be appreciated that the device 100 may deploy alternative actuator, such as motors, as well as the hydraulic drive system.

The support beam 120 has a first actuator 160 for rotating the common bracket 130 from vertical to horizontal orientation. The actuator 160 is preferably a hydraulic cylinder having a rod in pivoting connection to an upper appendage 134 on the common bracket 130.

The actuator 160 is operative to rotate the common bracket 130 about axis A6 via the rotary coupling 132 on the support beam 120 or 120' that connects the common bracket 130 thereto. Accordingly, this rotation of the common bracket 130 by the actuator 160 moves the barrel 10 between the vertical orientation preferred for transport and the horizontal orientation in racks when filled.

Figure 1A:
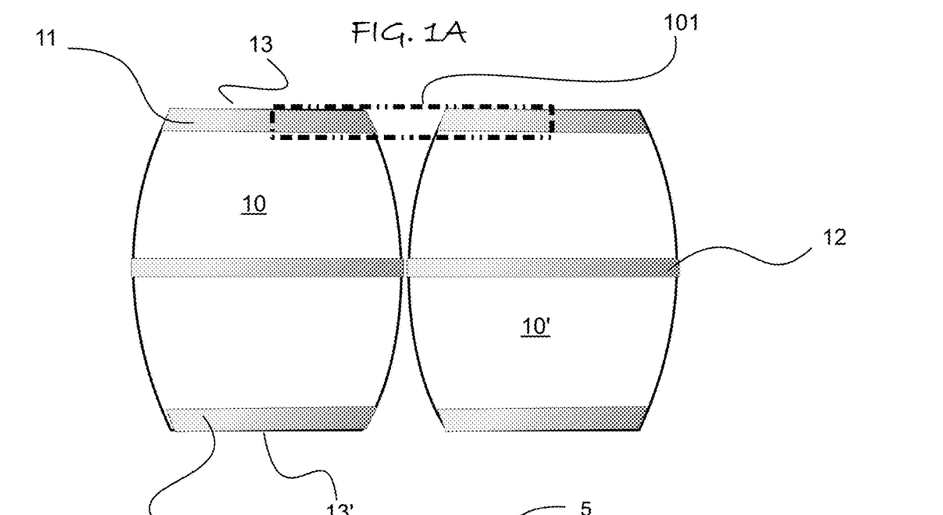
FIGS. 1A and 1B are elevation and plan views respectively of 2 adjacent stacked barrels to illustrate the confined space available for a grip member approach the barrel for grasping at the top and bottom edge on a barrel hoop.
Figure 1B:
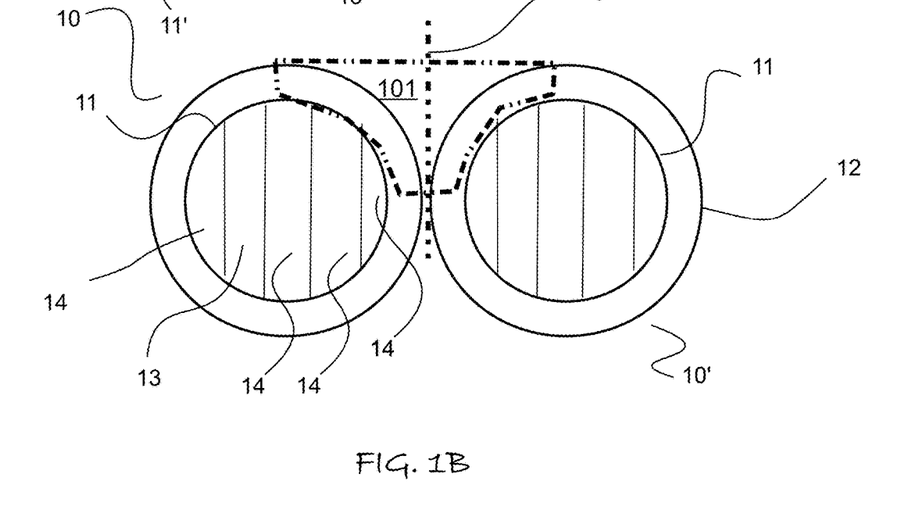

It should be appreciated that the arcuate grips 151-152' are sized and preferably limited in the range of pivoting movement to be confined within the natural spacing of barrels 10 at the head hoops 11 arising from the greater width of the barrel 10 at the bilge 12, as compared with the head or chime hoop 11. This region is illustrated by reference no. 101 in FIG. 1. The open position of the grips 151/152 and 151'/152' presents a wider opening at narrowest point than the barrel 10 head diameter, that is also smaller at an outer surface than the bilge 12 diameter. The wider opening allows the grips to be laterally moved around the barrel, while the outer surface clears laterally adjacent barrels 10. Thus in grasping a barrel 10, the grips 151 to 152' move in region 101.

When a barrel 10 is placed against a wall, such as reference line 5 in FIG. 1, the width of region 101 is now a confined space reduced by half. The wall can be in interior back or size of a truck used for shipping, or where barrels 10 are stacked in a warehouse. In order to extricate or place barrels in a stack immediately adjacent to such walls it is also preferable that the arcuate grips 151 to 152' have a distal taper defined by a distal inner perimeter 150$p$ with a radius of curvature that matches the head chime 11 of the target barrel 10 and a distal outer perimeter 150$o$ with a larger radius of curvature to accommodate clearing an adjacent barrel 10' when the grips 151/152 and 151'/152' are opened.

In a more preferred embodiment, illustrated in FIG. 6A-8, the arcuate grips have a tip member 155 that is urged to tilt outward by a biasing spring member 156. When the tip member 155 is biased outward from the barrel 10 the arcuate grip 150 do not have to pivot outward as much to clear the edge of the target barrel 10. This minimizes the outward extent or swing of the arcuate grips 151-152', and the components thereof, allows the device 100 to more closely approach adjacent barrel 10.

In the embodiment of FIG. 5, the tip member 155 optionally is also held between the plates 153 and 154, via bolts 159' and 157' respectively. Alternatively one or more of the grip members 151/152/151' and 152' is optionally a monolithic structure.

Figures 6A, 6B:
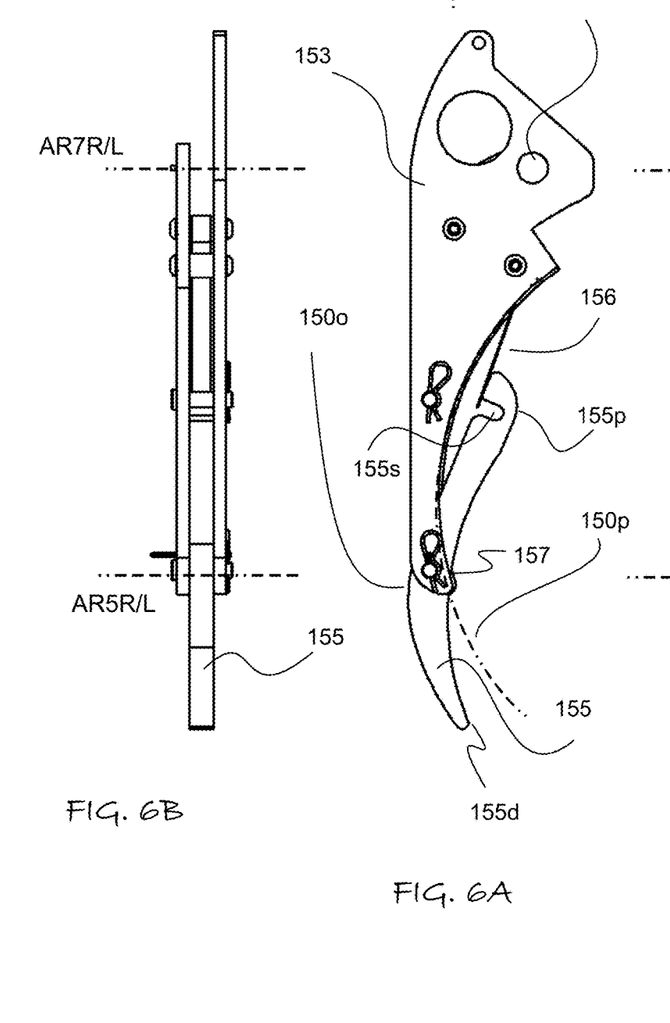
Figure 6C:
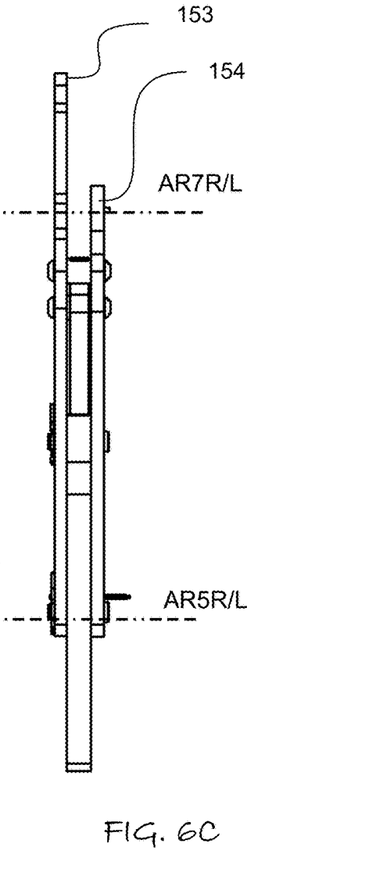
FIG. 6C is a rear elevation view thereof and FIG. 6D is a front elevation view thereof.
Figure 6D:
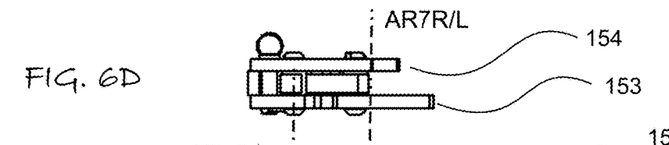
Figure 7:
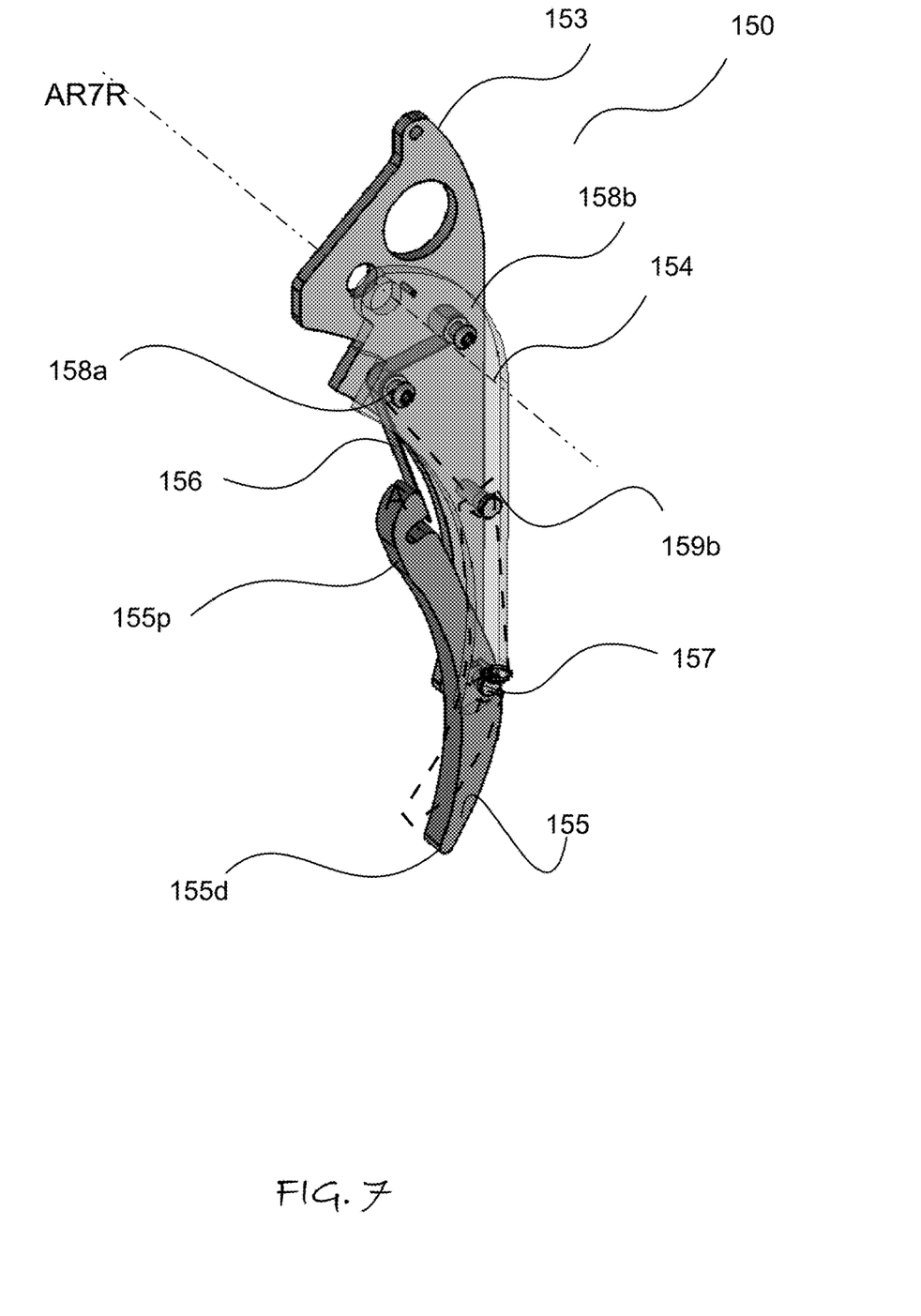
FIG. 7 is a perspective view of the arcuate grip member of FIG. 6A-D.
Figure 8:
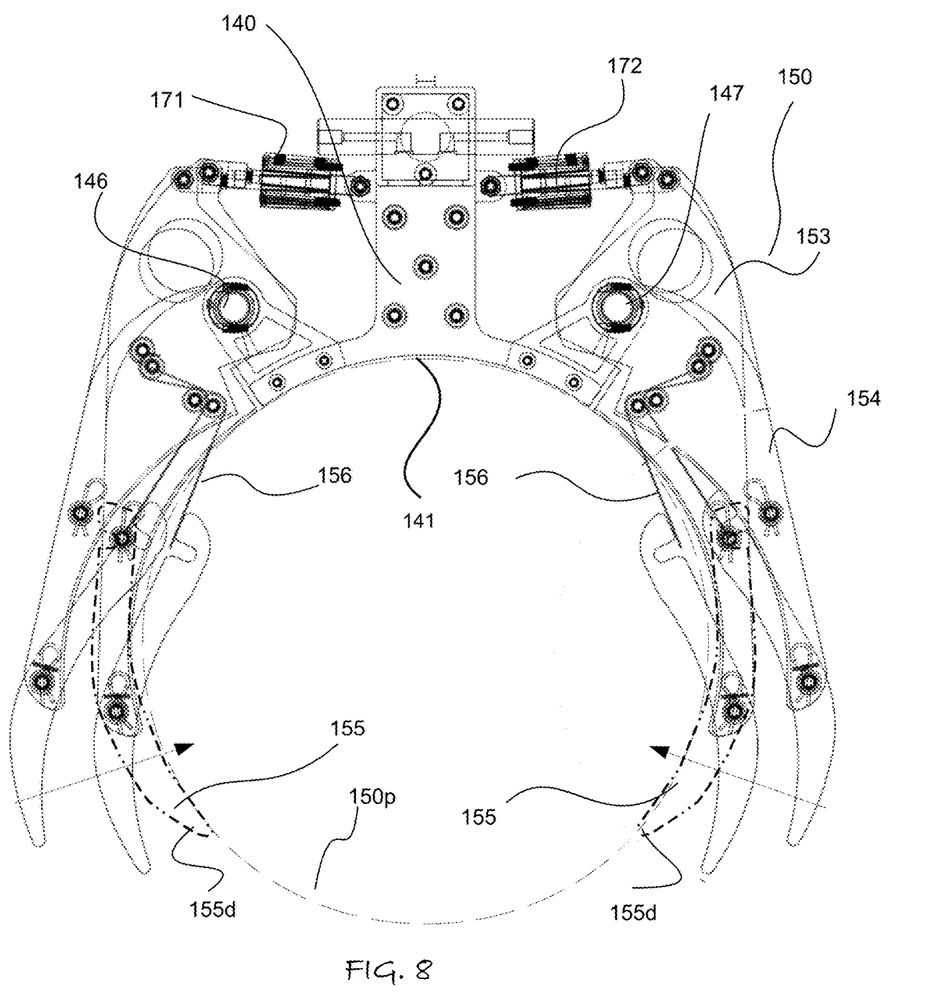
FIG. 8 is a top plan view of the embodiment of FIGS. 5 to 7 to illustrate the movement of the opposing arcuate grips about the head loop of a barrel in a confined space.
Figure 9:
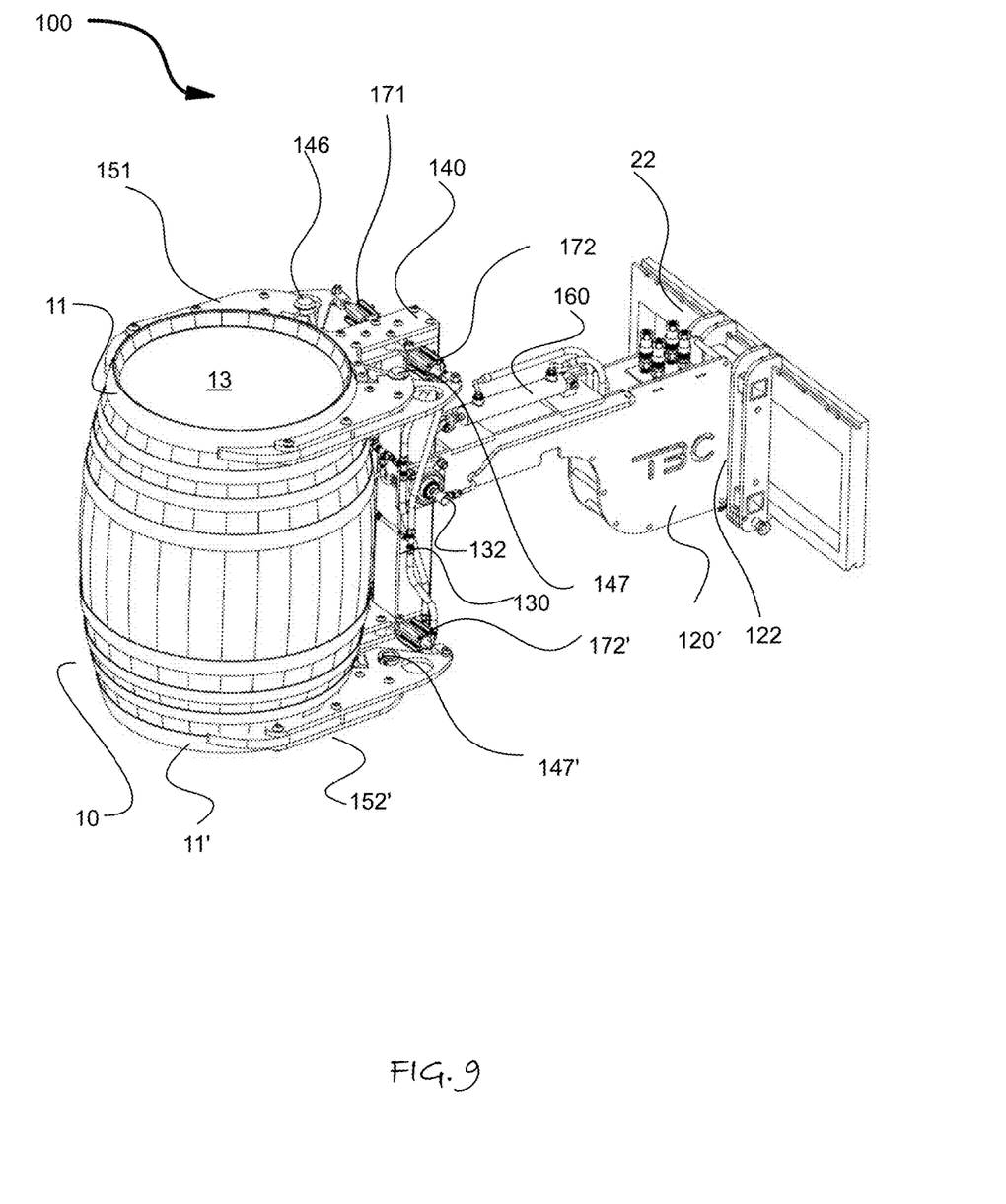
FIG. 9 is a perspective view of the embodiment of FIG. 5-7 holding a barrel in the vertical orientation.

In FIG. 6A and FIG. 7-8, the fixed bolt 157' is replaced by a rotary connector 157 and the tip member 155 has a slot 155$s$ that engage bolt 159$b$ as the barrel 10 urges the tip member 155 to pivot around the front side of the barrel 10 (as shown by the bolder broken line in FIG. 8).

Once the arcuate grips 151/152 and 151'/152' surround the barrel 10 so that both armatures 140 and 140' are most proximal to the barrel 10, the user deploys the actuators 171 and 172 to close the arcuate grips 151/152 and 151'/152'. The inward moment of these arcuate grips by the actuator 171 and 172 results in the head chime or hoop 11 contacting and urging a proximal portion 155$p$ opposite slot 155$s$ to oppose the resistive force of the spring 156 and thus tilt inward by pivoting about coupling 157. This results in the distal end 155$d$ of tip member 155 grasping the adjacent portion of the head hoop 11 of the barrel 10. This also aligns both the tip member 155 and the grips portion 152 along the distal inner perimeter 150$p$ to the head hoop 11. Each tip member 155 may be operative to rotate about the axis A5R or A5L at the rotary coupling 157 to the arcuate grip member 151/152/151'/152'. The tip members 155 may be disposed between the spaced apart plates or planar portions 153 and 154 of each arcuate grip member 151/152 and 15'/152'. The biasing spring 156 can be held at pins 158$a$ and 158$b$ that preferably also connect adjacent plates 153 and 154. The biasing spring 156 is illustrated as a strip of metal, which is resilient and would not plastically deform over the working range illustrated. However other forms of springs can be deployed such as torsion spring at the rotary coupling 157. It should also be noted from FIGS. 8 and 9 that each support armature 140 also has a front edge 141 with a first radius of curvature. The inside edge of each arcuate grip also has a first radius of curvature for engaging a portion of a perimeter of a side edge of a barrel, such as the chimes. When the grip actuator is energized to cause the distal end of each arcuate grip of pairs 151/152 and 151'/152' to move towards the distal end of the other arcuate grip of each pair, the front edge 141 of the support armature 140 and each arcuate grip of the pairs 151/152 and 151'/152' form a continuous arc with the first radius of curvature matching the radius of curvature of the barrel 10 at the head or chime hoop 11. Hence, to thoroughly grasp opposing chimes hoops 11 of the barrel 10 without the need to apply excessive force, the front edge 141 of the support armature 140 and the arcuate grip 151/152 and 151'/152' contact each chime hoop 11 of the barrel 10 about the continuous arc that is at least about 50 percent of a perimeter of the upper and lower chimes hoops 11.

Controller 180 is preferably disposed for installation in a fork lift cab so the fork lift driver/operator is able to activate the controller 180 to energize each actuator 160 and actuator pairs 171 and 172 as desired to rotate the common bracket 130 between vertical and horizontal orientation and open and close the arcuate grips to grasp or release the barrel 10. It is also preferred that the controller 180 is operative open and close the upper and lower arcuate grip members 151/152 and 151'/152' in unison.

Conventional means can be deployed to mount the horizontal frame 110 on a fork lift truck tines 1 and 1', as for example with clamps, bolts, welded attachment and the like. Conventional means can be used to laterally position the support beam 120 on the frame 110 as well as lock the support beam 120 on the horizontal frame 110, such as for example with clamps, bolts, welded attachment and the like.

Figure 3:
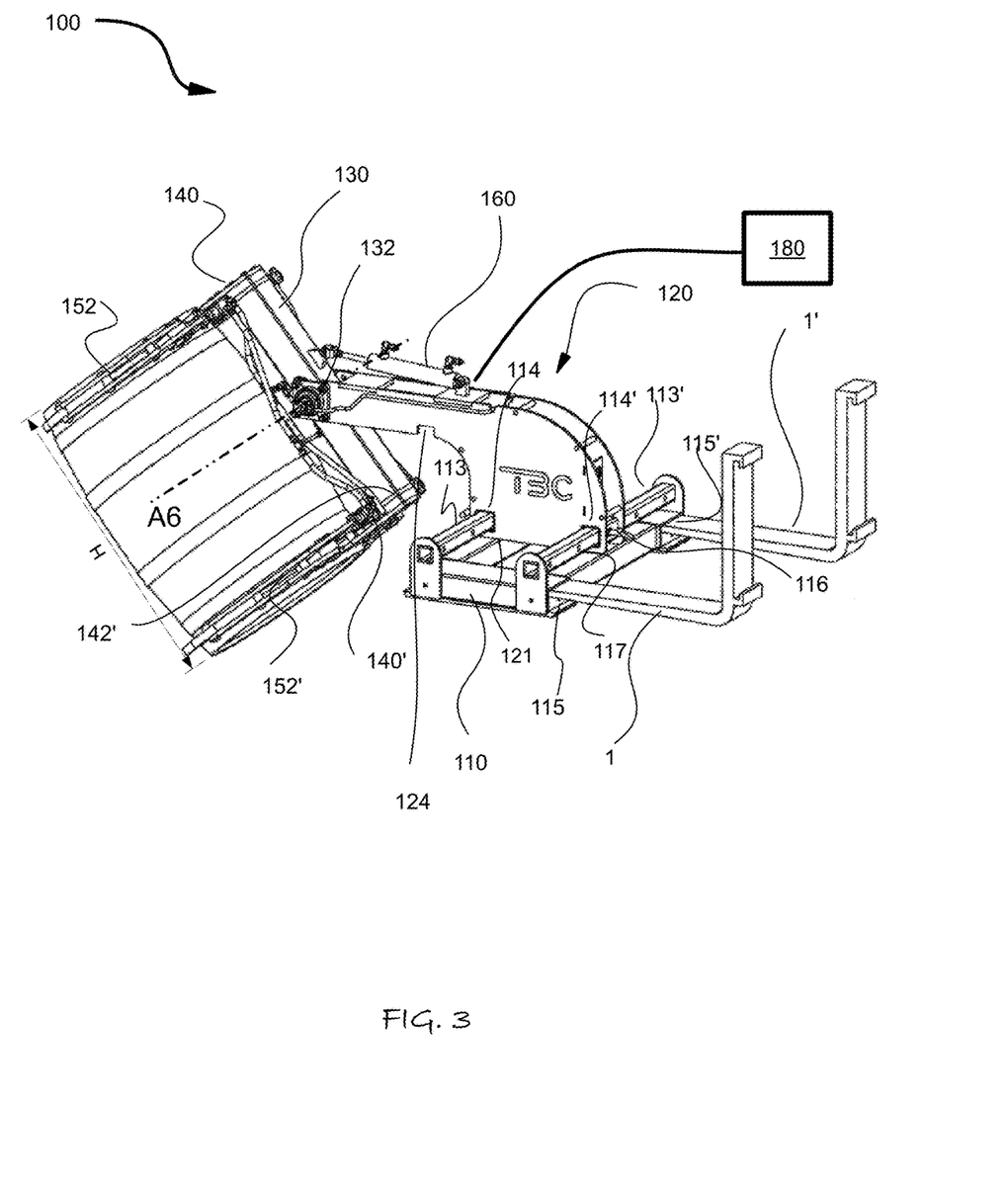
FIG. 3 is a perspective view of an embodiment of the apparatus for mounting on the conventional spaced apart tines of a forklift
Figure 4:
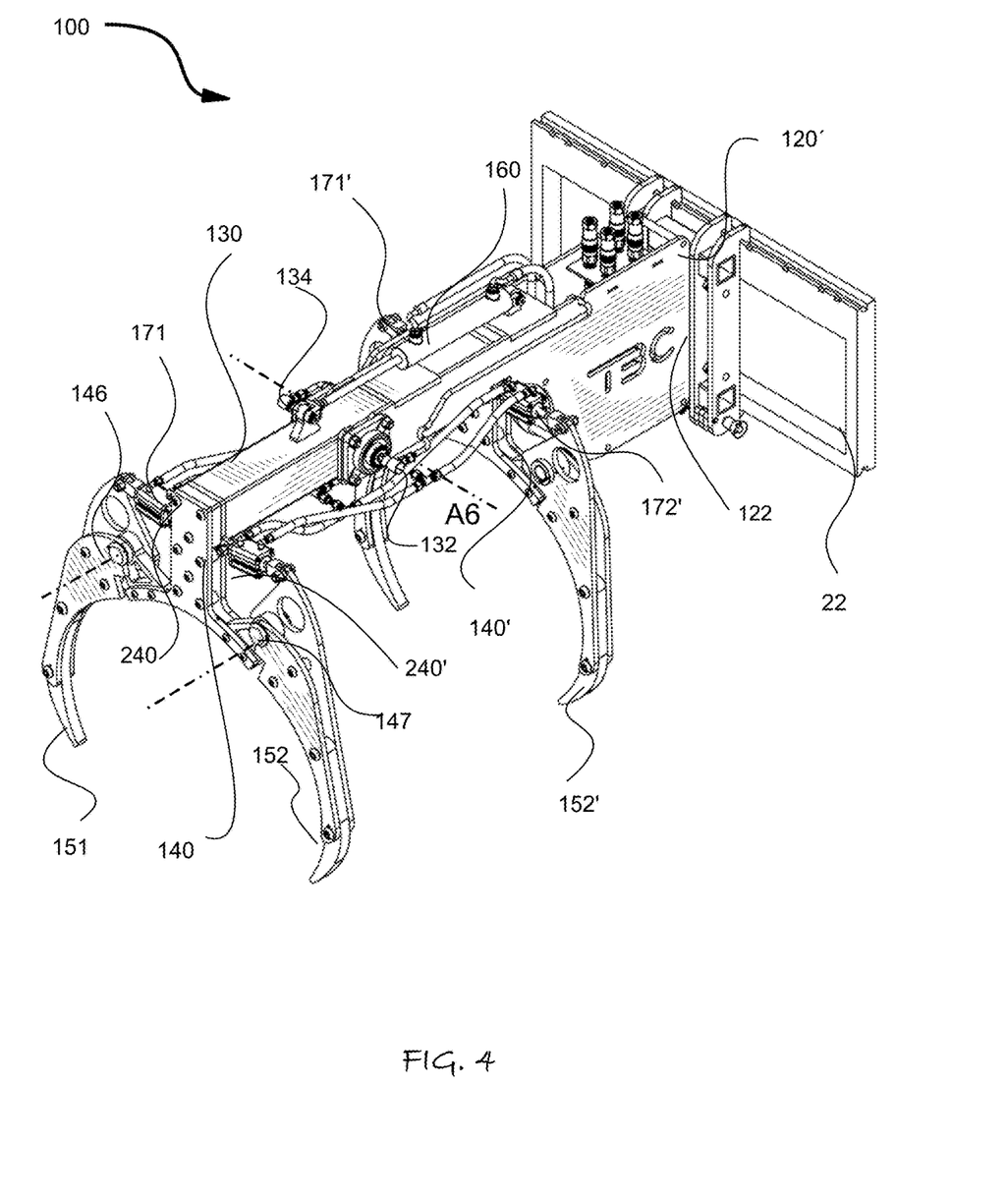
FIG. 4 is the embodiment of FIG. 2 tilted in a position to grasp a barrel in a rack.

The support beam 120 may have an inverted U shape to receive the horizontally rotated common bracket 130. The support beam 120 can also be constructed of adjacent spaced apart plates that are coupled together at multiple points to provide resistance to flexure in carrying the weight of the other mechanisms described herein. As illustrated in FIG. 3, the support beam 120 may also have a proximal notch 124 on opposing sides of the U shape to accommodate a base 142' of the lower support armatures 140' when the barrel 10 is rotated to the horizontal position.

Support beam 120 can be deployed with the horizontal frame 110 attached at the base 121, as shown in FIG. 3. As an alternative to the horizontal frame 110 a forklift adapter 22 can be connected at a side 122 of a different support beam 120' in FIGS. 2, 4 and 9. The forklift adapter 22 is optionally any portion or part of a forklift truck front end, or an attachment thereto to which the distal or non-working end of the device 100 can be securely attached.

It should also be appreciate the common bracket 130 and arcuate grips can be at least one of interchangeable or replaceable with larger or smaller like components to accommodate different size and shape barrels 10.

An alternative means to mount the horizontal frame 110 on a fork lift truck tines is optionally channels 115 and 115' in the horizontal frame 110 which are disposed to receive forklift prongs or tines 1 and 1'. An alternative means is a vertical plate that support a vertical side of the support beam 120 or is coupled to cantilever the support beam 120. The device 100 can be attached to a forklift by clamping, affixing, bolting or clamping to the fork lift tines 1 and 1'.

The means to laterally position and lock the support beam 120 on the horizontal frame 110 is optionally the lateral support brace rails 113 and 113'. The brace rails 113 and 113 extend through pairs of aperture 114 and 114' on the bottom of the support beam 120 permitting the lateral sliding for position adjustment on the horizontal frame 110. A locking pin type mechanism 116 on a lower portion of the support beam 120 adjacent the apertures 114 and 114' is removably coupled to holes or receiving notches 117 in one or more of the brace rails 113 and 113' and provides a means to lock the support beam 120 in place after lateral adjustment. This lateral adjustment to opposing sides of the horizontal frame 110 provides for the pickup and placement of barrels 10 adjacent a wall by avoiding the interference of the horizontal frame 110 with the wall.

Another aspect of the construction of the barrel handling apparatus 100 is the facile adaptability to accommodate different size barrels, which may frequently narrower and shorter than the 50-60 gallon wood barrels that are most common. This is accomplished by replacing the tip member 155 to fit the smaller or larger barrel. Further, to accommodate difference in barrel height the upper and lower support armatures 140 and 140' can be displaced with respect to the center of the common bracket 130. This is readily accomplished by have each support armature 140 and 140' have pairs of end rails, gears, wheels or slots that engage a complimentary linear mating surface that extends along the common bracket 130. The upper and lower support armatures 140 and 140' can be displaced that is moved closer or farther apart on the linear matting surface and then fixed in place when the separation of the tip member 155 at opposing ends matches the height of the target barrel, or any other dimension of the target barrel in which it is safe to apply gripping pressure. The support armature 140 and 140' can be fixed in place on the complimentary linear mating surface of the common bracket 130 by bolts that are inserted, as well as a friction or other clamp member. A tip member 155 would be wider for smaller barrels, depending on the degree of adjustment provided in the throw of the actuators. However, it should be appreciated that the width and radius of each tip 155 can be scaled along with the actuator throw in proportion to the barrel size to allow the corresponding access to tightly placed adjacent barrels. Alternatively, to accommodate different height barrels, the common bracket 130 can be configured as a telescoping assembly that expands in one or both opposing directions to displace the upper and lower support armatures 140 and 140'.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A device for barrel handling comprising:
    a) a horizontal frame member adapted to be elevated and transported by a fork lift truck,
    b) a support beam having an upward extending portion that is coupled at a base to the horizontal frame member with a laterally extending portion that extends outward from a distal end of the upward extending portion,
    c) a common bracket member having opposing ends that is coupled in rotary engagement with the support beam for being disposed between a vertical position and a horizontal position,
    d) upper and lower support armatures each being disposed at opposing ends of the common bracket member, each of the upper and lower support armatures having;
        i) at least one grip actuator,
        ii) a pair of opposing arcuate grips, each arcuate grip of the pair having a proximal end in rotary engagement with a portion of the support armature so as to oppose the other arcuate grip of the pair, and a distal end opposite the proximal end,
        iii) wherein the at least one grip actuator is operative to cause the distal end of each arcuate grip of the pair to move towards and away from the distal end of the other arcuate grip of the pair,
    e) a principal actuator for rotating the common bracket member from vertical to horizontal for rotating a barrel when the barrel is grasped by each pair of opposing arcuate grips at top and bottom edges of the barrel and the rotation is from a vertical to horizontal orientation.

2. The device for barrel handling according to claim 1 wherein a center of the common bracket member is coupled in rotary engagement with the support beam for being disposed between a vertical position and a horizontal position.

3. The device for barrel handling according to claim 1 further comprising a first and a second barrel of identical dimensions, in which each of the arcuate grips have,
    a) a distal taper defined by a distal inner perimeter with a first radius of curvature that matches a head chime of said first and second barrels, and
    b) a distal outer perimeter with a second radius of curvature that is larger than the first radius of curvature.

4. The device for barrel handling according to claim 1 wherein the at least one grip actuator is one of a motor and a hydraulic drive system.

5. The device for barrel handling according to claim 1 having two pairs of actuators for rotating each pair of arcuate grips in opposing directions about each of the upper and lower support armatures.

6. The device for barrel handling according to claim 1 comprising first and second grip actuators, each grip actuator being a hydraulic cylinder having a rod with a proximal end configured to extend from a proximal end of the hydraulic cylinder and an opposing distal end with a first pivotal coupling and the hydraulic cylinder having a distal end opposing the proximal end with a second pivotal coupling in which one of the first and second pivotal couplings engages a portion of the respective upper and lower support armatures that are proximal to the connection to the common bracket and the other of the first and second pivotal couplings engages an opposing arcuate grip of the respective upper and lower support armature.

7. The device for barrel handling according to claim 1 wherein each arcuate grip has a tip member that is urged to tilt outward from the other arcuate grip of the pair by a biasing spring member, wherein an inward movement of the arcuate grips by the actuator urges the tip member to tilt inward toward the other arcuate grip of the pair to grasp at least a portion of the edge of the barrel.

8. The device for barrel handling according to claim 7 that further comprises a means to laterally position and lock the support beam on the horizontal frame member.

9. The device for barrel handling according to claim 8 wherein the means to laterally position and lock the support beam on the horizontal frame member comprises lateral support brace rails that extend through pairs of apertures on the bottom of the support beam.

10. The device for barrel handling according to claim 1 wherein the arcuate grips of the upper and lower support armatures are operative to open and close in unison.

11. The device for barrel handling according to claim 1 further comprising a controller for installation in a fork lift cab that is operative to energize each actuator.

12. The device for barrel handling according to claim 1 further comprising a means to mount the horizontal frame member on a fork lift truck.

13. The device for barrel handling according to claim 12 wherein the means to mount the horizontal frame member on a fork lift truck comprises channels in the horizontal frame member to receive tines of a fork lift truck.

14. The device for barrel handling according to claim 1 further comprising a means to laterally position and lock the support beam on the horizontal frame member.

15. The device for barrel handling according to claim 1 wherein the support beam has an inverted "U"-shaped portion to receive the horizontally rotated common bracket member.

16. The device for barrel handling according to claim 15 wherein the support beam has a proximal notch on opposing sides of the inverted "U"-shaped portion to accommodate a base of the lower support armature when the principal actuator is energized to rotate the common bracket member to a horizontal position.

17. A device for barrel handling comprising:
 a) a support beam having a vertical portion for coupling to a forklift truck and a laterally extending portion coupled to extend away from a top of the vertical portion to have a distal end opposite the vertical portion,
 b) a common bracket member having opposing ends that is coupled in rotary engagement to the distal end of the support beam for being disposed between a vertical position and a horizontal position,
 c) upper and lower support armatures each being disposed at opposing ends of the common bracket member, each of the upper and lower support armatures having;
  i) at least one grip actuator,
  ii) a pair of opposing arcuate grips, each opposing arcuate grip of the pair having a proximal end in rotary engagement with a portion of the support armature so as to oppose the other arcuate grip of the pair, and a distal end opposite the proximal end,
  iii) wherein the at least one grip actuator is operative to cause the distal end of each opposing arcuate grip to move towards and away from the distal end of the other arcuate grip of the pair,
 d) a principal actuator for rotating the common bracket member from vertical to horizontal for rotating a barrel grasped by the each pair of arcuate grips from a vertical to a horizontal orientation.

18. The device for barrel handling according to claim 17 wherein each of the arcuate grips has a) a distal taper defined by a distal inner perimeter with a first radius of curvature and b) a distal outer perimeter with a second radius of curvature that is larger than the first radius of curvature.

19. The device for barrel handling according to claim 17 wherein each arcuate grip has a tip member that is urged to tilt outward from the other arcuate grip of the pair by a biasing spring member, wherein an inward movement of the arcuate grips by the actuator urges the tip member to tilt inward toward the other arcuate grip of the pair to grasp at least a portion of the edge of the barrel.

20. The device for barrel handling according to claim 17 wherein each of the upper and lower support armatures further comprises a front edge with a first radius of curvature and each arcuate grip of the pair has an inside edge with a radius of curvature substantially the same as the first radius of curvature and further wherein when each grip actuator is engaged to more toward the other, the front edge of the support armature and the inside edge of each arcuate grips of the pair form a continuous arc that extends along at least 50% of a perimeter of a circle with the first radius of curvature.

21. The device for barrel handling according to claim 17 wherein the support beam has an inverted "U"-shaped portion to receive the horizontally rotated common bracket member.

22. The device for barrel handling according to claim 21 wherein the support beam has a proximal notch on opposing sides of the inverted "U"-shaped portion to accommodate a base of the lower support armature when the principal actuator is energized to rotate the common bracket member to a horizontal position.

23. The device for barrel handling according to claim 17 further comprising a first and a second barrel of identical dimensions, in which each of the arcuate grips have a) a distal taper defined by a distal inner perimeter with a first radius of curvature that matches a head chime of said first and second barrels, and b) a distal outer perimeter with a second radius of curvature that is larger than the first radius of curvature.

24. The device for barrel handling according to claim 17 wherein the support beam extends laterally to the common bracket member in a first direction and has a width transverse to the first direction wherein the upper and lower support armatures are wider in the transverse direction than the support beam.

25. A method of moving barrels comprising the steps of:
 a. providing a device for barrel handling comprising
  i) a transportable support member,
  ii) a common bracket member having opposing ends that is coupled in rotary engagement with the support member for being disposed between a vertical position and a horizontal position,
  iii) upper and lower support armatures each being disposed at opposing ends of the common bracket member, each of the upper and lower support armatures having;
   1) at least one grip actuator,
   2) a front edge with a first radius of curvature
   3) a pair of opposing arcuate grips, each arcuate grip having a proximal end in rotary engagement with a portion of the support armature so as to oppose the other arcuate grip of the pair, and a distal end opposite the proximal end, in which an inside edge of each arcuate grip has first radius of curvature for engaging a portion of a perimeter of a side edge of a barrel,
   4) wherein the at least one grip actuator is operative to cause the distal end of each arcuate grip to move towards and away from the distal end of the other arcuate grip, wherein when each grip actuator is engaged to move each arcuate grip toward the other arcuate grip of the pair, the front edge of the support armature and each arcuate grip of the pair form a continuous arc with the first radius of curvature,
  iv.) a principal actuator for rotating the common bracket member from vertical to horizontal for rotating a barrel grasped by the grip actuators at the top and bottom edge of the barrel from a vertical to a horizontal orientation, b. providing at least one barrel having a bilge disposed between an upper and a lower chime, in which the bilge has a second radius of curvature to have a wider diameter than each chime, in which each chime has a radius of curvature substantially the same as the first radius of curvature, c. approaching the at least one barrel to position the front edge of each support armature adjacent a portion of the upper and lower chime of the barrel and the opposing arcuate grips of each support armature about one of the upper and lower chimes of the barrel d. energizing the at least one actuator of the upper and lower support armatures to grasp the upper and lower chimes of the barrel such that the front edge of the support armature and the arcuate grip actuators contact each chime of the barrel about the continuous arc that is at least about 50 percent of a perimeter of the upper and lower chimes.

26. The method of moving barrels according to claim 25 wherein each arcuate grip has an outside edge opposite the inside edge and when the at least one actuator of the upper and lower support armatures is not energized the maximum separation between the outside edge of each opposing arcuate grip is less than twice the second radius of curvature.

27. The method of moving barrels according to claim 25 further comprising the step of energizing the principal actuator to rotate the common bracket member from a vertical orientation by at least 90 degrees to modify the orientation of at least one barrel grasped by the grip actuators.

* * * * *